April 13, 1965 F. W. KARASEK ETAL 3,178,263
METHOD OF PRODUCING PHOSPHORIC ACID
Filed Jan. 26, 1961 2 Sheets-Sheet 1
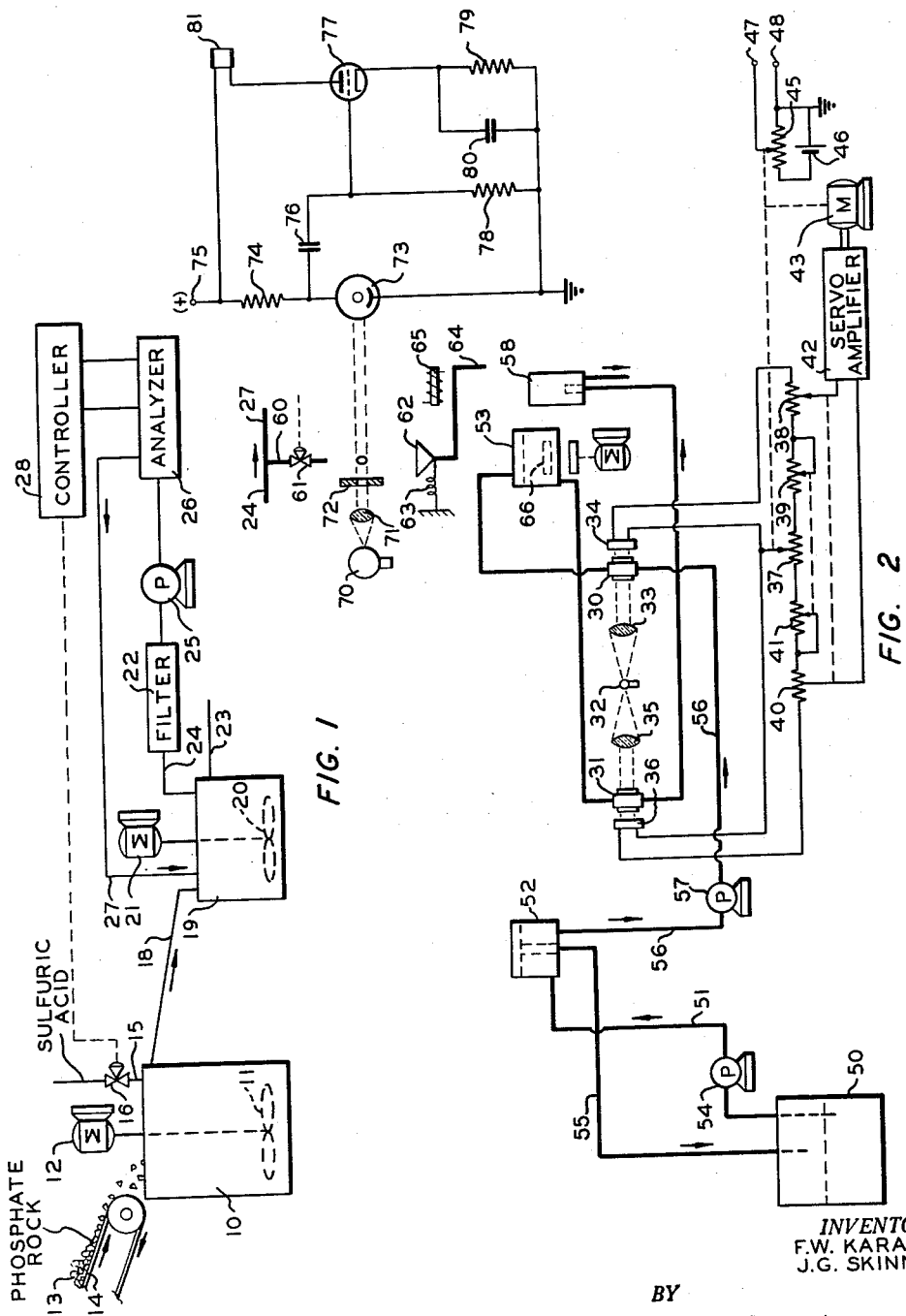
INVENTORS
F.W. KARASEK
J.G. SKINNER
BY
Hudson & Young
ATTORNEYS

INVENTORS
F.W. KARASEK
J.G. SKINNER 3,178,263
METHOD OF PRODUCING PHOSPHORIC ACID
Francis W. Karasek, Bartlesville, Okla., and John G. Skinner, Corvallis, Oreg., assignors to Phillips Petroleum Company, a corporation of Delaware
Filed Jan. 26, 1961, Ser. No. 85,012
5 Claims. (Cl. 23—165)

This invention relates to the production of phosphoric acid.

This application is a continuation-in-part of copending application Serial No. 591,621, filed June 15, 1956, now U.S. Patent 2,979,385.

In the production of phosphoric acid by the so-called "wet" process, the principal reaction is that between phosphate rock and sulfuric acid, as shown by the equation

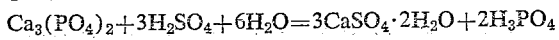
$$Ca_3(PO_4)_2 + 3H_2SO_4 + 6H_2O = 3CaSO_4 \cdot 2H_2O + 2H_3PO_4$$

to yield phosphoric acid and calcium sulfate dihydrate, or gypsum. An important side reaction is that involving fluorine, present initially in the rock as calcium fluoride or in a combined form as fluorapatite. The fluorine is largely converted to silicon tetrafluoride, hydrofluosilicic acid and fluosilicates.

In this operation, a small and closely controlled excess of sulfuric acid is desirable. The concentration of this excess sulfuric acid is important because of its effect on the character of the gypsum crystals. The crystals are removed by filtration and the filter cake is washed to recover additional phosphoric acid. If the excess sulfuric acid concentration in the reactor varies beyond relatively narrow limits, the crystal structure of the gypsum is adversely affected, giving rise to difficulties in filtration and washing, with a consequent decrease in system capacity and efficiency. The excess sulfuric acid concentration is generally maintained at approximately 2.5 percent by weight.

A photometric analyzer is utilized to advantage in accordance with the present invention to measure the sulfuric acid concentration. A colorless solution containing barium ions is directed through a first cell to a mixing chamber. A sample of material from the reactor is added to the chamber, thereby forming a white barium sulfate precipitate. This is directed through a second cell. The light transmission properties of the two cells are compared to provide a quantitative measurement of the sulfate ion concentration in the sample. In response to this measurement, the acid concentration in the reactor is controlled at a desired value.

Accordingly, it is an object of this invention to provide a method of and apparatus for regulating chemical reactions in response to an analysis of a sample from the reactor.

Another object is to provide a method of controlling the rate of addition of sulfuric acid to phosphate rock in the production of phosphoric acid.

Other objects, advantages and features of the invention should become apparent from the following detailed description, taken in conjunction with the accompanying drawing in which:

FIGURE 1 is a schematic representation of the control system of this invention used in the production of phosphoric acid;

FIGURE 2 is a schematic representation of the photometric analyzer employed in the system of FIGURE 1.

Figure 3:
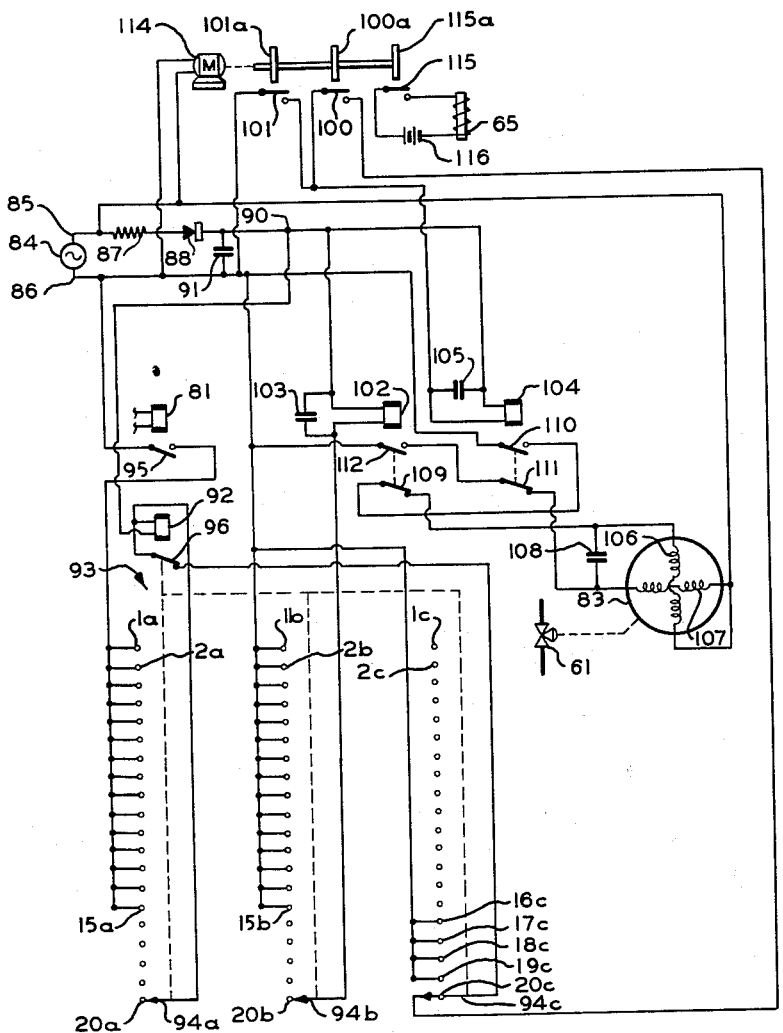
FIGURE 3 is a schematic circuit drawing of sample dropping rate control mechanism.

Referring now to the drawing in detail and to FIGURE 1 in particular, there is shown a reactor 10 having a stirrer 11 which is actuated by a motor 12. Ground phosphate rock 13 is added to reactor 10 by means of a conveyor belt 14. Sulfuric acid is introduced into reactor 10 through a conduit 15 which has a control valve 16 therein. The mixture in reactor 10 overflows through a conduit 18 into a second reactor 19 which is provided with a stirrer 20 that is driven by a motor 21. The mixture is again agitated in reactor 19 and overflows into an outlet conduit 23. Additional reactors in series may be employed, if desired. In some applications a single reactor is all that is required.

A sample of the material in reactor 19 is withdrawn through a conduit 24, which has a filter 22 therein, and is directed by a pump 25 to an analyzer 26. The sample is returned to reactor 19 from analyzer 26 through a conduit 27. Analyzer 26 determines the sulfate ion concentration in the sample stream and provides a representative output signal to a controller 28. The output signal from controller 28 adjusts valve 16 to regulate the rate of acid addition to reactor 10. If the measured sulfate ion concentration should exceed a predetermined limit, the rate of acid addition is decreased. Conversely, if the measured concentration of the sulfate ions should decrease below a second predetermined limit, the rate of acid addition is increased. Controller 28 can be a conventional instrument which provides an output regulated air pressure, for example, proportioned to an input electrical signal. Obviously, the rate of phosphate rock could be controlled in response to analyzer 26. However, control of the acid is more easily accomplished.

Analyzer 26 is illustrated in detail in FIGURE 2. This analyzer comprises first and second sample cells 30 and 31 which have radiation transparent windows. A first beam of radiation is directed from a lamp 32 by a collimating lens 33 through cell 30 to impinge upon a photocell 34. A second beam of radiation from lamp 32 is directed by a second collimating lens 35 through cell 31 to impinge upon a second photocell 36. Corresponding first terminals of photocells 34 and 36 are connected to one another and to the contactor of a potentiometer 37. The second terminal of photocell 34 is connected through a potentiometer 38 and a variable resistor 39 to the first end terminal of potentiometer 37. The second terminal of photocell 36 is connected through a potentiometer 40 and a variable resistor 41 to the second end terminal of potentiometer 37. Variable resistors 39 and 41 are mechanically connected to one another so that an increase in resistance of one results in a corresponding increase in the resistance of the other. This permits the sensitivity of the bridge circuit to be varied. The contactors of potentiometers 38 and 40 are connected to the respective input terminals of a servo amplifier 42. The output signal from amplifier 42 energizes a reversible motor 43. The drive shaft of motor 43 is connected to the contactor of potentiometer 37.

The drive shaft of motor 43 is also connected to the contactor of a telemetering potentiometer 45. A voltage source 46 is connected across the end terminals of potentiometer 45. The contactor and one end terminal of potentiometer 45 are connected to respective terminals 47 and 48 which in turn are connected to the input of controller 28 of FIGURE 1.

The outlet of a liquid storage tank 50 is connected by means of a conduit 51, having a pump 54 therein, to the inlet of an overflow tank 52. An overflow conduit 55 returns to tank 50. Liquid at a constant pressure is directed from tank 52 through a conduit 56, having a metering pump 57 therein, to the inlet of cell 30. This liquid flows from cell 30 to a container 53. From container 53, liquid flows by gravity through cell 31 to an overflow drain 58.

Tank 50 contains a 0.4 weight percent aqueous solution of barium chloride, for example. This concentration can vary considerably, and other solutions which contain barium ions can be so employed. This colorless solution is directed through cell 30. A sample from conduit 24 is added to container 53 in the manner described hereinafter in detail. The sulfate ions in the sample combine with the barium ions to form barium sulfate, a white precipitate. The amount of precipitate formed is a function of the concentration of the sulfate ions in the sample stream removed from vessel 19. The resulting material is directed through sample cell 31. The amount of radiation transmitted through cell 31 is thus less than the radiation transmitted through cell 30 so that photocell 36 generates less current than does photocell 34.

The output currents from photocells 34 and 36 are connected in opposition to one another across the illustrated bridge network. The bridge initially is balanced under reference conditions by moving the contactors of potentiometers 38 and 40 in unison. A balanced condition is obtained when the potentials at the contactors of the two potentiometers are equal. Any change in the relative amounts of light transmitted through the two sample cells changes the relative currents generated by the two photocells so that the potentials at the contactors of potentiometers 38 and 40 are no longer equal. This results in a direct current signal being applied to the input terminals of amplifier 42. The polarity of this signal depends upon the relative light transmissions through the two sample cells. This direct current signal is converted into a corresponding alternating current signal which is amplified and applied to motor 43. Motor 43 rotates in a direction to move the contactor of potentiometer 37 until the bridge circuit is again balanced, as indicated by the potentials at the contactor of potentiometers 38 and 40 being equal. Amplifier 42 and motor 43 can be any known type of equipment, such as of the form described in Electronic Control Handbook, Batcher and Moulick, Caldwell-Clements, Inc., New York, 1946, page 298, for example.

One of the problems encountered in analyzers of this type is that of obtaining reproducible stable colloidal suspensions. This is due to the fact that the turbidity of a colloidal sol varies with the size of the colloidal particles as well as with concentration. Furthermore, the individual particles tend, on standing, to coalesce. In accordance with this invention, a small quantity of gelatine, 0.2 weight percent, for example, was added to the barium chloride solution. The gelatine functions as a protective lyophilic colloid so that the precipitate remains dispersed. A small amount of a preservative, such as sodium benzoate, can be added to prevent spoilage of the gelatine.

An important feature of the analyzer resides in controlling the rate of addition of the sample stream to container 53. A conduit 60, having a needle valve 61 therein, communicates at one end with the junction between sample conduits 24 and 27. The second end of conduit 60 terminates at a region above container 53 so that a portion of the sample stream circulated through conduits 24 and 27 can be dropped into container 53. Needle valve 61 is adjusted so that the stream falls into container 53 as individual droplets. A funnel 62 normally is retained beneath conduit 60 by means of a spring 63. The droplets falling into funnel 62 are removed from the system through a drain conduit 64. A solenoid 65 is mounted adjacent funnel 62 so that the funnel is displaced against the force of spring 63 when the solenoid is energized. This permits the droplets from conduit 60 to fall into container 53. Container 53 is provided with a magnetically actuated stirrer 66 which provides mixing of the barium and sulfate ions.

Apparatus is provided to count the rate at which the droplets fall from conduit 60. A beam of radiation from a lamp 70 is directed by lens 71 through an aperture in a plate 72 so as to intersect the falling droplets. This beam of radiation impinges upon a photoelectric tube 73. Each falling droplet momentarily blocks the light beam. The cathode of tube 73 is connected to ground, and the anode thereof is connected through a resistor 74 to a positive potential terminal 75. The anode of tube 73 is also connected through a capacitor 76 to the control grid of a triode 77. The control grid of triode 77 is connected to ground through a resistor 78. The cathode of triode 77 is connected to ground through a resistor 79 which is shunted by a capacitor 80. The anode of triode 77 is connected to terminal 75 through the coil of a relay 81.

Each time the radiation beam is blocked by a falling droplet, the conduction through tube 73 is momentarily extinguished. This results in the potential at the anode of tube 73 increasing rapidly. The resulting positive pulse is applied through capacitor 76 to the control grid of triode 77. This pulse causes tube 77 to conduct momentarily to energize the coil of relay 81.

The apparatus employed to control needle valve 61 is illustrated in FIGURE 3. Needle valve 61 is adjusted by rotation of a reversible two-phase servo motor 83. The control circuit of FIGURE 3 is energized from a source of alternating current 84 which has output terminals 85 and 86. Terminal 85 is connected through a resistor 87 and a rectifier 88 to a junction 90, which is referred to hereinafter as terminal 90. A capacitor 91 is connected between terminals 86 and 90. A direct current operating potential thus exists between terminals 90 and 86. Terminal 90 is connected to the first terminal of a coil 92 which energizes a stepping switch 93. The second terminal of coil 92 is connected to a first switch arm 94a of the stepping switch. Switch arm 94a is adapted to engage a first bank of contacts 1a, 2a, ... 20a in sequence when coil 92 is energized. Contacts 1a, 2a ... 15a are connected to one another and to terminal 86 through a switch 95 which is closed each time relay coil 81 is energized. The second terminal of coil 92 is also connected through an interrupter switch 96 to a second switch arm 94c of the stepping switch. Switch arm 94c is adapted to engage contacts 1c, 2c ... 20c in sequence. Contacts 16c, 17c, 18c, and 19c are connected to one another and to terminal 86. Contact 20c is connected through switches 100 and 101 to terminal 86. Stepping switch 93 is provided with a third switch arm 94b which is adapted to engage contacts 1b, 2b ... 20b in sequence. Contacts 1b, 2b ... 15b are connected to one another and to terminal 86. Switch arm 94b is connected to terminal 90 through the coil of a relay 102. A capacitor 103 is connected in parallel with the coil of relay 102.

The coil of a relay 104 is connected between terminals 90 and 86 through switch 101. A capacitor 105 is connected in parallel with the coil of relay 104. Motor 83 is provided with first and second windings 106 and 107 which are mounted at right angles to one another. Corresponding first terminals of windings 106 and 107 are connected to one another and to terminal 85. A capacitor 108 is connected between the second end terminals of windings 106 and 107. The second terminal of winding 106 is connected through switches 109 and 110 to terminal 86. The second terminal of winding 107 is connected through switches 111 and 112 to terminal 86. Switch 109 is open and switch 112 is closed when relay 102 is energized. Switch 111 is open and switch 110 is closed when relay 104 is energized.

Switches 100 and 101 are adapted to be closed by respective cams 100a and 101a which are rotated by a synchronous motor 114. Motor 114 is energized by current source 84. A third cam 115a is rotated by motor 114 to close a switch 115. Switch 115 is connected in circuit with a voltage source 116 and a solenoid 65. It is normally desired that only about one out of every thirty drops from conduit 60 falls into container 53. Cam 115a is set so that switch 115 is closed momentarily to permit funnel 62 to be displaced. This can occur once every minute, for example. Cam 100a is set to close switch 100 momentarily at the beginning of each calibration cycle. Cam 101a closes switch 101 at the beginning of each calibration cycle and keeps the switch closed a predetermined time interval, which can be one-half minute, for example.

The calibration cycle begins by cam 100a closing switch 100 momentarily. Switch 101 is closed almost immediately thereafter to energize relay 104. At the same time, the stepping switch is advanced one position because a circuit is completed through coil 92 by means of switch arm 94c and contact 20c. This moves the three switch arms to the first contacts. Relay 102 is energized through switch arm 94b and contact 1b. Thus, relays 102 and 104 are energized almost simultaneously at the beginning of the cycle. The stepping switch is then energized to move the switch arms to the next contacts each time relay 81 is energized by a droplet from conduit 60 interrupting the radiation beam. At the end of the one-half minute period, switch 101 is opened by cam 101a. This deenergizes relay 104. Motor 83 is then connected across current source 84 so as to be rotated in a first direction if relay 102 is still energized. This rotation of motor 83 is in a direction so as to increase the opening in needle valve 61 to increase the dropping rate. Motor 83 thus continues to rotate until the switch arms move into engagement with the 16th contacts. At this time, relay 102 is deenergized so that motor 83 is no longer connected to current source 84. The arms of the stepping switch are rapidly returned to the 20th contacts by the circuit completed through contacts 16c, 17c, 18c, and 19c.

If the dropping rate should be such that the arms of the stepping switch reach the 16th contacts before switch 101 is opened, relay 102 becomes deenergized while relay 104 remains energized. This connects motor 83 across current source 84 in the opposite manner so that the motor is rotated in a second direction. This motor rotation tends to close needle valve 61 and decrease the dropping rate. Needle valve 61 thus tends to be positioned so that 15 droplets fall from conduit 60 during the period, one-half minute, that switch 101 is closed by cam 101a.

The particular number of droplets in a given time interval obviously depends upon the size of needle valve 61 and the desired rate of sample addition to container 53. The number of contacts employed on the stepping switches and the length of timing cycle obviously can be varied to accommodate different desired rates. This rate obviously depends on the reagent concentration and circulation rate and the sample concentration. Excellent results were obtained with the reagent previously described circulated at a rate of 15 cc. per minute and the sample dropped at the rate of 30 drops per minute, or 2 cc. per hour.

In one specific embodiment of the process of this invention, finely ground (70-80 percent through 200-mesh screen) phosphate rock is added to system at the rate of 19.5 tons per hour. A typical analysis of such rock is as follows:

| Ingredient: | Weight percent |
|---|---|
| $P_2O_5$ | 32.56 |
| F | 3.59 |
| Combined water | 57.49 |
| Free water | 2.87 |
| Non-reactive | 3.49 |

Concentrated sulfuric acid is normally added through conduit 15 at a rate of approximately 16.4 tons per hour. The total reaction time of the rock and acid is approximately two hours, and the temperature of the reaction is maintained in the range of 160–190° F. Valve 16 is regulated by controller 28 to maintain the sulfuric acid concentration in the sample removed through conduit 24 constant at approximately 2.5 weight percent. If the measured sulfate ion concentration should fall below this value, more acid is added through conduit 15. If the measured sulfate ion concentration should increase, less acid is added.

In view of the foregoing description, it should be apparent that there is provided in accordance with this invention an improved method of regulating the production of phosphoric acid. While the invention has been described in conjunction with a present preferred embodiment, it obviously is not limited thereto.

What is claimed is:

1. A process for producing phosphoric acid, which comprises the steps of:
   continuously adding sulfuric acid and phosphate rock to a mixing zone;
   continuously removing a sample of the mixture resulting from the reactions in said mixing zone;
   filtering said sample to remove crystals therefrom, thereby producing a filtrate;
   directing said sample to an analysis zone;
   in said analysis zone, directing a first beam of radiation through a liquid containing barium ions in solution and producing a first signal which is a function of the light transmission through said liquid;
   adding a portion of said filtrate from the filtered sample to said barium containing liquid at a controlled constant rate, thereby forming a precipitate representative of the concentration of sulfuric acid in said mixture resulting from the reaction in said mixing zone;
   directing a second beam of radiation through the resulting liquid containing said precipitate and producing a second signal which is a function of the light transmission through said liquid containing said precipitate;
   combining said first and second signals to produce a third signal which is a function of the variation between said first signal and said second signal and therefore a function of the concentration of the sulfuric acid in said mixture resulting from the reactions in said mixing zone; and
   controlling the relative rates of addition of said sulfuric acid and said phosphate rock to said mixing zone responsive to said third signal to maintain said variation constant at a value representative of a desired concentration of sulfuric acid in said mixture resulting from the reaction in said mixing zone.

2. The method of claim 1 wherein the relative rates of addition of sulfuric acid and phosphate rock to said mixing zone are controlled so that an excess of approximately 2.5 weight percent sulfuric acid is maintained in said mixing zone.

3. The process of claim 1 wherein said phosphate rock is added to said mixing zone at a constant rate and the rate of addition of said sulfuric acid is regulated responsive to said third signal.

4. A process for producing phosphoric acid, which comprises the steps of:
   continuously adding sulfuric acid and phosphate rock to a mixing zone;
   continuously removing a sample of the mixture resulting from the reactions in said mixing zone;
   filtering said sample to remove crystals therefrom, thereby producing a filtrate;
   directing said sample to an analysis zone;
   in said analysis zone, directing a first beam of radiation through a liquid containing a reagent which will react with sulfate ions in said sample and change the light transmission properties thereof, and producing a first signal which is a function of the light transmission through said signal;
   adding a portion of said filtrate from the filtered sample at a controlled constant rate to said reagent containing liquid, thereby changing the light transmission characteristics of said reagent containing liquid;
   directing a second beam of radiation through the resulting liquid having changed light transmission characteristics and producing a second signal which is a function of the light transmission through said liquid having said changed light transmission characteristics;

combining said first and second signals to produce a third signal which is a function of the variation between said first signal and said second signal and therefore a function of the concentration of the sulfuric acid in said mixture resulting from the reactions in said mixing zone; and controlling the relative rates of addition of said sulfuric acid and said phosphate rock to said mixing zone responsive to said third signal to maintain said variation constant at a value representative of a desired concentration of sulfuric acid in said mixture resulting from the reactions in said mixing zone.

5. A process for producing phosphoric acid, which comprises the steps of:

continuously adding sulfuric acid and phosphate rock to a mixing zone;

continuously removing a sample of the mixture resulting from the reactions in said mixing zone;

filtering said sample to remove crystals therefrom, thereby producing a filtrate;

directing said sample to an analysis zone;

in said analysis zone, adding said sample to a solution containing barium ions;

measuring the resulting barium sulfate precipitation;

producing a control signal representative of the measurement of said barium sulfate precipitate; and controlling the relative rates of addition of said sulfuric acid and said phosphate rock to said mixing zone responsive to said control signal to maintain said signal constant at a value representative of a desired concentration of sulfuric acid in said mixture resulting from the reactions in said mixing zone.

References Cited by the Examiner

UNITED STATES PATENTS

| | | | |
|---|---|---|---|
| 1,940,689 | 12/33 | Moore | 23—165 |
| 2,019,871 | 11/35 | Pettingill | 23—230 |
| 2,044,164 | 6/36 | Gulliksen | 250—14.5 |
| 2,049,032 | 7/36 | Weber et al. | 23—165 |
| 2,362,278 | 11/44 | Jones | 23—230 |
| 2,462,995 | 3/49 | Ritzmann | 250—43 |
| 2,504,544 | 4/50 | Legal et al. | 23—165 |
| 2,504,545 | 4/50 | Waring et al. | 71—40 |
| 2,656,845 | 10/53 | Lindsay | 88—14 |
| 2,694,335 | 11/54 | Albright et al. | 88—14 |
| 2,887,362 | 5/59 | Lee | 23—165 |
| 2,953,440 | 9/60 | Claudy | 23—253 |
| 3,104,946 | 9/63 | Veal | 23—165 |

OTHER REFERENCES

Mellor: "Mellor's Modern Inorganic Chemistry," Revised Edition, 1939, Longmans, Green & Company, page 471.

MAURICE A. BRINDISI, *Primary Examiner.*